US008255252B2

(12) United States Patent
Chug et al.

(10) Patent No.: US 8,255,252 B2
(45) Date of Patent: Aug. 28, 2012

(54) SYSTEM AND METHOD FOR FACILITATING STRATEGIC CONTRACT AUDIT, RESOLUTION AND RECOVERY

(75) Inventors: Arpit Chug, New Delhi (IN); Naveen Jain, Haryana (IN); Rakesh Kanda, New Delhi (IN); Chetan Lohani, Haryana (IN); Shachindra Pandey, Haryana (IN)

(73) Assignee: American Express Travel Related Services Company, Inc., New York, NY (US)

( * ) Notice: Subject to any disclaimer, the term of this patent is extended or adjusted under 35 U.S.C. 154(b) by 912 days.

(21) Appl. No.: 11/972,069

(22) Filed: Jan. 10, 2008

(65) Prior Publication Data

US 2009/0182606 A1 Jul. 16, 2009

(51) Int. Cl.
*G06Q 40/00* (2012.01)
(52) U.S. Cl. ......................................... 705/7.11; 705/35
(58) Field of Classification Search .................. 705/7.11, 705/35

See application file for complete search history.

(56) References Cited

U.S. PATENT DOCUMENTS

| 5,765,138 | A | * | 6/1998 | Aycock et al. | 705/7 |
| 7,120,649 | B2 | * | 10/2006 | Goldfarb et al. | 707/674 |
| 7,346,527 | B2 | * | 3/2008 | McKay et al. | 705/7 |
| 2001/0034611 | A1 | * | 10/2001 | Ooya et al. | 705/1 |
| 2002/0082891 | A1 | * | 6/2002 | McKay et al. | 705/8 |
| 2002/0087382 | A1 | * | 7/2002 | Tiburcio | 705/9 |
| 2005/0027552 | A1 | * | 2/2005 | Massanelli et al. | 705/1 |

* cited by examiner

*Primary Examiner* — Thomas Dixon
*Assistant Examiner* — Benjamin S Fields
(74) *Attorney, Agent, or Firm* — Snell & Wilmer L.L.P.

(57) ABSTRACT

A system and method for facilitating consistent management of a repeatable contract audit, resolution and recovery process is disclosed. A methodology that tightly defines the contract audit, resolution and recovery events enables an audit team to evaluate supplier performance against a contract, ascertain the existing health of a contract, and identify opportunities to improve and/or re-engineer a contracting process. The method begins with a meeting with a client, followed by a meeting with the supplier, and progresses to a process review, data collection, and a data analysis, which results in recommendations that are presented to the supplier based on the findings of the audit team. The audit team then works with the supplier to resolve any issues identified by the data analysis.

18 Claims, 4 Drawing Sheets

SYSTEM AND METHOD FOR FACILITATING STRATEGIC CONTRACT AUDIT, RESOLUTION AND RECOVERY

FIELD OF THE INVENTION

The invention generally relates to facilitating strategic contract audit, resolution and recovery, and more particularly, to a system and method for evaluating supplier performance against a contract, determining the current health of a contract and determining potential opportunities for improvement in order to provide optimal and sustained cost savings for an organization.

BACKGROUND OF THE INVENTION

A contract with quality and effective terms is very important for those who participate in business-to-business, business-to-consumer, and consumer-to-consumer financial transactions. As such, organizations often seek ways to improve their contracting procedures to ensure that the organization will benefit from the terms of any contract. However, without developing and adhering to sound and repeatable steps, the contracting procedures of an organization are difficult to measure in terms of efficiency, risk, price compliance, and the like.

Furthermore, ensuring that contract terms are developed and negotiated in light of ever-changing business conditions is difficult when companies do not establish, and comply with, consistent and repeatable procedures. Many organizations may employ contracting procedures, yet not establish methodologies that consider variances in economic conditions and business needs, so the organizations will most likely experience lost opportunities and reduced profits. As such, there is a need for a contract audit, resolution and recovery business practice that enables an organization to evaluate supplier performance, ascertain the existing health of contracts and identify opportunities to improve and re-engineer contracting procedures.

SUMMARY

The system and method enables an organization to evaluate supplier performance against the terms of a contract. The invention further defines exemplary contract audit steps. The audit steps include obtaining a sponsorship, identifying a sourcing team, pre-planning a sourcing event, selecting potential suppliers, determining a sourcing approach, developing evaluation criteria, developing an RFx recipient list, and conducting evaluations. With a certain list of vendors, the system enables commodity managers to develop a tactical negotiation strategy, conduct negotiations, select suppliers, obtain approved funding documents, finalize contractual documents, and/or conduct supplier enablement activities.

BRIEF DESCRIPTION OF THE DRAWINGS

A more complete understanding of the invention may be derived by referring to the detailed description and claims when considered in connection with the Figures, wherein like reference numbers refer to similar elements throughout the Figures, and:

DETAILED DESCRIPTION OF REPRESENTATIVE EMBODIMENTS

The detailed description of the illustrated embodiments herein makes reference to the accompanying drawings, which show a representative embodiment by way of illustration and its best mode. While these embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. Moreover, any part of the functions or steps may be performed manually, use automation, use hardware and software, and/or outsourced to or performed by one or more third parties. Furthermore, any reference to singular includes plural embodiments, and any reference to more than one embodiment may include a singular embodiment.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In general, the system and method facilitates contract audit, resolution and recovery within an organization. As used herein, "contracting" or similar terms may include any activity related to negotiating, agreeing, purchasing, renting, leasing, or otherwise obtaining items and/or services from public, private, or governmental sources. Contracting includes, for example, the description of required items and services, the selection and solicitation of sources, the preparation and awarding of contracts and the like. As used herein, an "item" may include any product, good, service, data, information, activity, event, step, process and/or the like. In one embodiment, the system includes computing systems, databases, and a network expressly designed to carry out the processes disclosed herein. However, practitioners will appreciate that the system and method is not so limiting. The disclosed contract audit, resolution and recovery steps and processes may be carried out by any known methods including, for example, email, postal mail, facsimile, wireless communications, cell phones, direct verbal communication, and/or any technology now known or hereinafter developed.

Figure 1A:
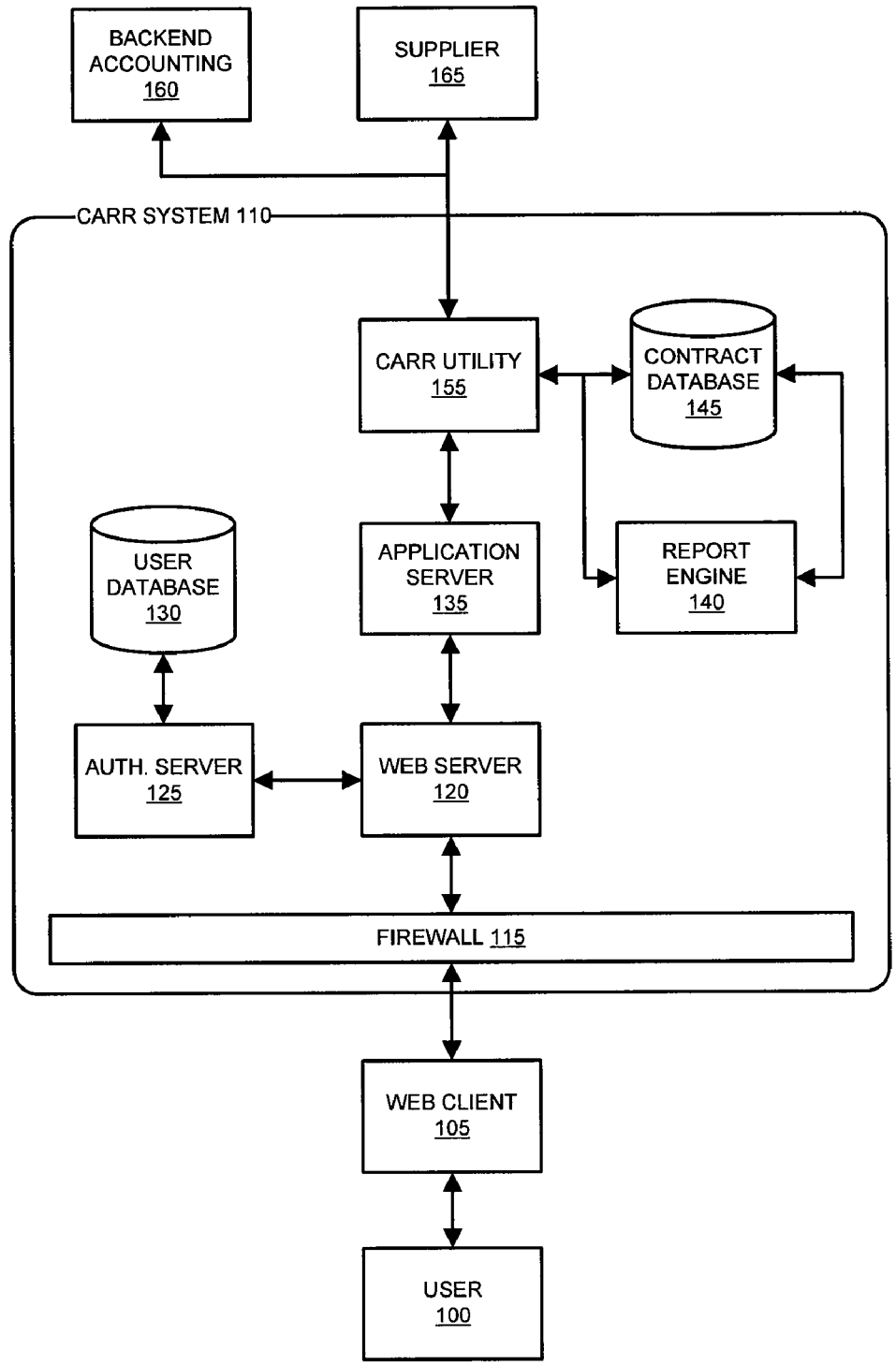
FIG. 1 is a block diagram illustrating the major representative system components for managing tasks, templates, and data for a contract audit, resolution and recovery system, according to embodiments of the present invention.

With reference to FIG. 1A, a contract audit, resolution and recovery (CARR) system 110 facilitates interaction between a user 100 and a CARR utility through, in one embodiment, a web client 105 with a network connection to a web server 120. Web server 120 may employ an authentication server 125 in order to validate and assign proper permissions to authorized users of CARR system 110. User database 130 stores user credentials and permissions specific to each user. Web server 120 also employs an application server 135 to manage various applications and utilities that are utilized by CARR system

110. In one embodiment, CARR utility 155 is invoked by application server 135 to query contract database 145, retrieve data, and perform complex calculations and data formatting for presentation to user 100 and/or any other designated third party. Contract database 145 maintains data related to, for example, business units, departments, managerial hierarchies, projects, templates, suppliers, contracts, and/or the like. Practitioners will appreciate that the system may incorporate any number and configurations of databases both internal and external to CARR system 110 for the purpose of storing any of the data elements described herein. In one embodiment, application server 135 may interface with a report engine 170 to create pre-configured and/or ad-hoc reports representing any data elements herein.

In addition to the components described above, CARR system 110 may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: user database 130, contract database 145, as well as any number of other databases, both internal and external to CARR system 110 useful in the operation of the invention as disclosed.

As used herein, the term "network" may include any electronic communications device which incorporates both hardware and software components. Communication among the parties may be accomplished through any suitable communication channels, such as, for example, a telephone network, an extranet, an intranet, Internet, point of interaction device (e.g., point of sale device, personal digital assistant (e.g., Palm Pilot®, Blackberry®), cellular phone, kiosk, etc.), online communications, satellite communications, off-line communications, wireless communications, transponder communications, local area network (LAN), wide area network (WAN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI or any number of existing or future protocols. Specific information related to the protocols, standards, and application software utilized in connection with the Internet is generally known to those skilled in the art and, as such, need not be detailed herein. See, for example, Dilip Naik, Internet Standards and Protocols (1998); Java 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

In one embodiment, CARR utility 155, or any other CARR system 110 component, may interact with any number of additional computing systems and databases in order to facilitate, for example, workflow management, ordering, billings, accounting, shipping, and the like. Computing systems and databases residing outside of CARR system 110 may be administered by an organization's system administrator or any other third party entity directly or indirectly involved in facilitating the disclosed system.

As will be appreciated by one of ordinary skill in the art, the invention may be embodied as a customization of an existing system, an add-on product, upgraded software, a standalone system (e.g., kiosk), a distributed system, a method, a data processing system, a device for data processing, and/or a computer program product. Accordingly, the invention may take the form of an entirely software embodiment, an entirely hardware embodiment, or an embodiment combining aspects of both software and hardware. Furthermore, the invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

User 100 may include any individual, group, business, entity, government organization, software and/or hardware which interact with CARR system 110. User 100 may interact with CARR system 110 to plan, schedule, execute, and/or manage contract audit and analysis events. User 100 may be, for example, a member of a team who is charged with engaging clients (e.g., buyers) in order to obtain specific information to carry out the disclosed processes. Moreover, user 100 may interact with CARR system 110 to create and access saved templates, presentations, reports, and/or the like. In another example, user 100 may be an administrator who interacts with various CARR system 110 components to manage one or more clients through the addition, deletion, and/or modification of data stored in contract database 145 and/or user database 130. In one embodiment, CARR system 110 may provide limited or restricted access for certain people or groups, such as, for example, managers, employees, vendors, or any other third party with an interest in managing contracting activities. User 100 may interface with CARR system 110 via any communications protocol, device or method discussed herein or known in the art. In one embodiment, user 100 may interact with the system via an Internet browser at a web client 105 and/or any other system known in the art.

Web client 105 may comprise any hardware and/or software suitably configured to facilitate input, receipt and/or viewing of any information related to CARR system 110 or any information discussed herein. Web client 105 may include any device (e.g., personal computer), which communicates (in any manner discussed herein) with the invention via any network discussed herein. Such browser applications comprise Internet browsing software installed within a computing unit or system to conduct online transactions and communications. These computing units or systems may take the form of a computer or set of computers, although other types of computing units or systems may be used, including laptops, notebooks, hand held computers, set-top boxes, workstations, computer-servers, main frame computers, minicomputers, PC servers, pervasive computers, network sets of computers, and/or the like. Practitioners will appreciate that web client 105 may or may not be in direct contact with the CARR system 110. For example, web client 105 may access the services of the CARR system 110 through another server, which may have a direct or indirect connection to web server 120.

As those skilled in the art will appreciate, web client 105 may include an operating system (e.g., WINDOWS NT, 95/98/2000/Vista, OS2, UNIX, LINUX, SOLARIS, MAC OS, etc.) as well as various conventional or customized support software and drivers typically associated with computers. The web client 105 may include any suitable personal computer, network computer, workstation, minicomputer, mainframe or the like. Web client 105 can be in a home or business environment with access to a network. In an exemplary embodiment, access is through a network or the Internet through a commercially available web-browser software package.

Web client 105 may be independently, separately or collectively suitably coupled to the network via data links which includes, for example, a connection to an Internet Service Provider (ISP) as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network. Moreover, the system contemplates the procurement, use, sale or distribution of any goods, services or information over any network having similar functionality described herein.

The various embodiments contemplate uses in association with web services, utility computing, pervasive and individualized computing, security and identity solutions, autonomic computing, commodity computing, mobility and wireless solutions, open source, service oriented architecture, biometrics, grid computing and/or mesh computing.

Web server 120 may include any hardware and/or software suitably configured to facilitate communications between web client 105 and one or more CARR system 110 components. Further, web server 120 may be configured to transmit data to web client 105 within markup language documents. Web server 120 may operate as a single entity in a single geographic location or as separate computing components located together or in separate geographic locations. Requests originating from client browser 105 may pass through a firewall 115 before being received and processed at web server 120. As used herein, "transmit" may include sending electronic data from one system component to another over a network connection. Additionally, as used herein, "data" may include encompassing information such as commands, queries, files, data for storage, and/or the like in digital or any other form. Web server 120 may provide a suitable web site or other Internet-based graphical user interface which is accessible by users 100, administrators, clients, or any other authorized third party. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Any of the communications, inputs, storage, databases or displays discussed herein may be facilitated through a web site having web pages. The term "web page" as it is used herein is not meant to limit the type of documents and applications that might be used to interact with the user. For example, a typical web site might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service that receives a request from a web server, the request including a URL (http://yahoo.com/stockquotes/ge) and an IP address (123.56.789.98). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

In one embodiment, firewall 115 comprises any hardware and/or software suitably configured to protect CARR system 110 components from users of other networks. Firewall 115 may reside in varying configurations including stateful inspection, proxy based and packet filtering among others. Firewall 115 may be integrated as software within web server 120, any other system component or may reside within another computing device or may take the form of a standalone hardware component.

In one embodiment, applications server 135 includes any hardware and/or software suitably configured to serve applications and data to a connected web client 105. Like web server 120, applications server 135 may communicate with any number of other servers, databases and/or components through any means discussed herein or known in the art. Further, applications server 135 may serve as a conduit between web client 105 and CARR utility 155. Web server 120 may interface with applications server 135 through any means discussed herein or known in the art including a LAN/WAN, for example. Application server 135 may further interact with authentication server 125, contract database 145, user database 130, report engine 170 or any other CARR system 110 component in response to a user 100 request.

To control access to web server 120 or any other component of the system, web server 120 may invoke authentication server 125 in response to submission of user 100 authentication credentials received at web server 120. In one embodiment, authentication server 125 includes any hardware and/or software suitably configured to receive authentication credentials, encrypt and decrypt credentials, authenticate credentials, and grant access rights according to user 100 predefined privileges attached to the credentials. Authentication server 125 may grant varying degrees of application and data level access to user 100 based on user information stored within user database 130.

In one embodiment, user database 130 includes any hardware and/or software suitably configured to facilitate storing authentication and/or privilege information relating to users 100. Contract database 145 stores data relating to form templates, client engagement letters, contract terms, audit histories, schedules, as well as any other related information as disclosed herein. One skilled in the art will appreciate that the invention may employ any number of databases in any number of configurations. For example, a database may be employed to store functions and/or parameters that are used by CARR utility 155 to exchange information with backend accounting systems 175, supplier systems 180, and the like. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the invention by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of the invention, the data can be stored without regard to a common format. However, in one exemplary embodiment of the invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set (e.g., loaded, initialized, ready, blocked, removable, or deleted). Subsequent bytes of data may be used to indicate, for example, the identity of the issuer, user, transaction/membership account identifier and/or the like.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to create, update, delete or augment the data in accordance with the header or trailer. As such, in one embodiment, the header or trailer is not stored on the transaction device along with the associated issuer-owned data but instead the appropriate action may be taken by providing to the transaction instrument user at the standalone device, the appropriate option for the action to be taken. The invention may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the invention may consist of any combination thereof at a single location or at multiple locations, wherein each database or system includes any of various suitable security features, such as firewalls, access codes, encryption, decryption, compression, decompression, and/or the like.

The invention may be described herein in terms of functional block components, screen shots, optional selections and various processing steps. It should be appreciated that such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, the software elements of the invention may be implemented with any programming or scripting language such as C, C++, JAVA, COBOL, assembler, PERL, Visual Basic, SQL Stored Procedures, extensible markup language (XML), with the various algorithms being implemented with any combination of data structures, objects, processes, routines or other programming elements. Further, it should be noted that the invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

The software elements of the present invention may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts, text messages, and the like. It should be further appreciated that the multiple steps as illustrated and described may be combined into single web pages but have been expanded for the sake of simplicity. In other cases, steps illustrated and described as single process steps may be separated into multiple web pages but have been combined for simplicity.

Referring now to the figures, the block system diagram and process flow diagrams represent mere embodiments of the invention and are not intended to limit the scope of the invention as described herein. For example, the steps recited in FIGS. 2-3B may be executed in any order and are not limited to the order presented. It will be appreciated that the following description makes appropriate references not only to the steps depicted in FIGS. 2-3B, but also to the various system components as described above with reference to FIG. 1.

Figure 2:
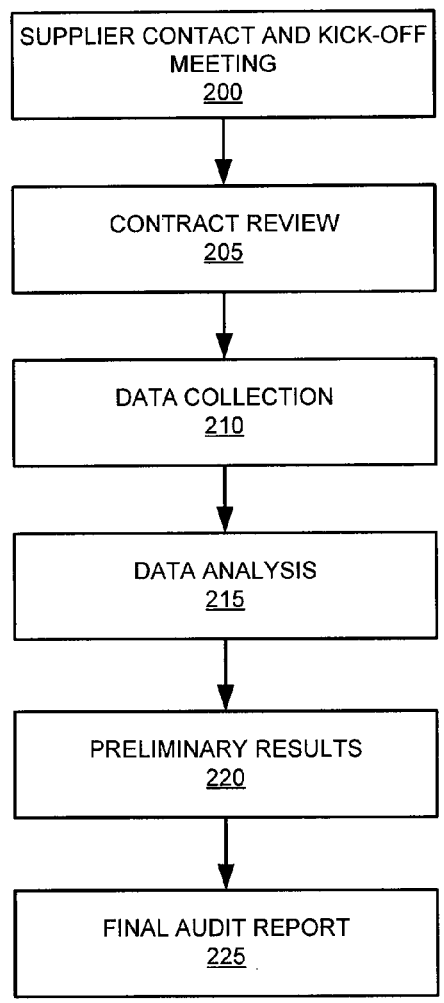
FIG. 2 is a process flow diagram of exemplary high-level steps for executing a contract audit, resolution and recovery process, according to exemplary of the present invention; and, FIG. 3A-3B is a process flow diagram of exemplary detailed steps for executing a contract audit, resolution and recovery process, according to embodiments of the present invention.

With reference to FIG. 2, the disclosed contract audit, resolution and recovery processes are based on a proven methodology that identifies savings and provides critical benchmarks for documenting sustainable savings to an organization. In one embodiment, the process begins with a supplier contact and kick-off meeting (step 200) where team members can share the scope and approach, identify points of contact, finalize a project charter, and agree on governance. A contract review (step 205) is an opportunity for team members to review a contract and define audit objectives in light of the contract. Moreover, the team may discuss and map business process and controls. A project plan template may be used at this step in order to ensure that the audit is thoroughly and consistently mapped out prior to facilitating the audit. Practitioners will appreciate that a plan template may take any form including, for example, a paper document that is completed by hand, a computer spreadsheet, or a web page that is presented at web client 105.

In one embodiment, the plan template includes a list of project phases with a start date and target completion date corresponding to each phase. The plan template further includes details for each project phase such as, for example, what steps should be taken during a particular phase, what forms should be completed, meetings to be scheduled, and the like. Further, the plan template identifies any templates and target completion dates corresponding to each project phase step.

During a data collection (step 210) phase, the team gathers requisite data from a supplier of the contract, gathers requisite data from the client's internal systems, and discusses the process, data, and methodology to obtain a clear understanding of the client's needs. A data analysis (step 215) is performed on the collected data in order to identify opportunities. This includes analyzing billing data as per the contract, performing a comprehensive audit as per the audit plan, and documenting the findings. The documented findings are analyzed to create preliminary results (step 220). The preliminary results (step 220) are formatted into a preliminary report, which is delivered to the client with recommendations. The findings are reviewed by the client and feedback from the client is captured, and client and supplier approvals of the findings are secured. The team then produces a final audit report (step 225) from data and information obtained during the previously executed steps. The final audit report is submitted to the client to secure final approvals, and to obtain client and supplier sign-off on the action plan.

Figure 3A:
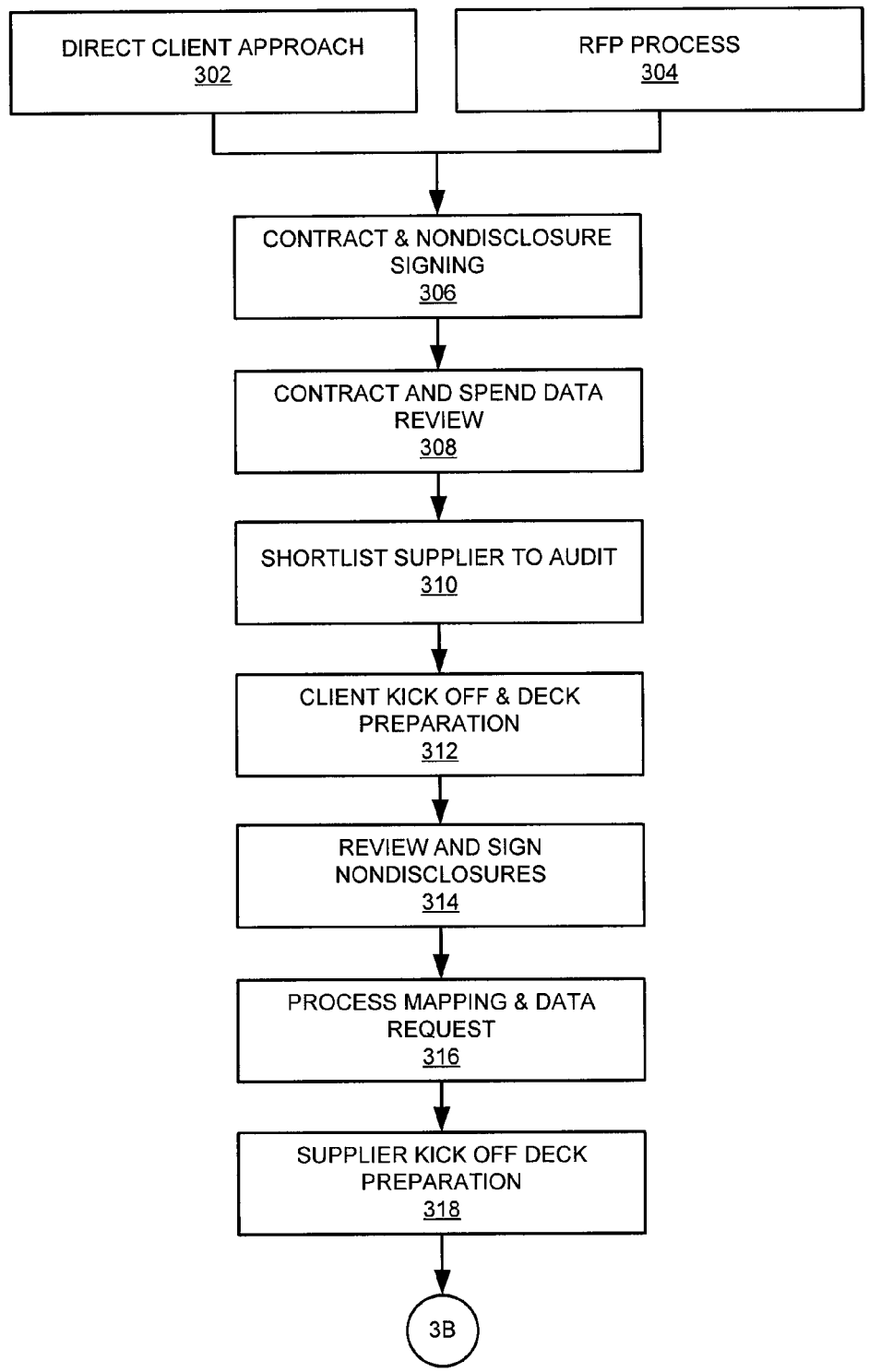

With reference to FIG. 3A, two representative paths for entry into an external contract audit, resolution and recovery process includes a direct client approach (step 302) and a Request for Proposal (RFP) process (step 304). The direct client approach (step 302) may be applied for existing clients and the RFP approach (step 304) may be applied to non-existing clients in order to further develop the client base. When the client has agreed to participate in the contract audit, resolution and recovery process, then the client is directed to review and sign a contract for the audit services (step 306). Moreover, an audit team leader may be directed by the organization to sign any relevant nondisclosure statements (step 306). Nondisclosure statements are often desired by an organization prior to providing a third-party auditor to participate in an RFP. Practitioners will appreciate that the content and scope of contracts and nondisclosure statements may vary according to the nature of an organization, as well as its own defined standards.

The audit team obtains one or more contracts from the organization as well as any accounting information that will be required for a thorough review and audit (step 308). In addition to the contract, spend data may include any information related to financial transactions that occurred between the parties of the contract during the term of the contract. In one embodiment, suppliers are short listed (step 310) for audit based on predefined criteria such as, for example, commodity, spend, contract structure etc. and a supplier feasibility report is prepared. Supplier assessment may be recommendatory in nature and final decision to select or drop suppliers vests with the client leadership.

During a client kick-off and specification preparation phase (step 312), the client should be educated about the audit process, the document requirements, the data requirements, and outcome expectations. A presentation template may be used for this purpose to ensure consistency in information delivery among clients. In one embodiment, a kick-off meeting template may include a series of printed pages and/or PowerPoint slides. A kick-off meeting overview may be presented first, wherein the client is provided with general information regarding the nature of the meeting. This information may include, for example, an introduction of the audit team and an overview of the contract compliance audit including objectives, methodology, input requirements, data requirements, and deliverables. The overview may further define the scope and timelines, project governance, spend category overview, audit team contact information, and next steps. Each of these items will now be discussed in greater detail.

After verbally introducing the audit team to the client, a team member may discuss the audit objectives. In one embodiment, the audit objectives include identifying non-compliance to contract with focus on financial impact, identifying business process and contractual gaps, highlighting process improvement and reengineering opportunities, and recovering non-compliant spend.

In discussing the audit methodology, the information provided in reference to FIG. 2 may be presented. The audit methodology provides the client with a more focused view into the audit, resolution and recovery process steps that will be executed over a defined period of time. Regarding audit inputs and data requirements, the client is alerted as to what types of information will be desired in order to facilitate a successful contract audit, resolution and recovery. Such information may include, for example, access to short listed supplier contracts and amendments, accounts payable, purchase orders, rate cards, line level billing, supplier timesheets, supplier reports, and the like.

The audit deliverables may be discussed in order to provide the client with outcome expectations. In one embodiment, audit deliverables are broken down into three primary categories: 1) project management, 2) compliance audit, and 3) audit resolution restitution and action plan. Sub categories that more precisely describe the primary audit deliverables may be discussed with the client. The project management category may include the following sub categories: a) project plan, schedules, and related coordination, b) organize joint audit kick-off meeting with the client's stakeholders and supplier, and c) periodic update to the customer's and supplier's senior management. The compliance audit category may include the following sub categories: a) data analysis, b) executive summary highlighting anomalies, c) observations, recommendations and value adds, and d) audit report covering anomalies. In discussing the audit resolution, restitution, and action plan category, a team member may want to discuss how the audit team will work with, and support, the client on during the settlement phase.

In discussing the scope and timelines, specific information regarding the audit should be disclosed to the client. Such information may include, for example, the commodity, the supplier name, the period of time that the audit will consider, a region, spend, and the like. This information may be repeated for each commodity/supplier if more than one are within the scope of the audit. A high level work plan also helps the client to better understand audit events within a timeline. In one embodiment, a chart is presented showing each audit event in terms of where each event falls on a timeline. Such events include, for example, identify project, engage client, prepare audit plan, engage supplier, gather data, perform analysis, deliver preliminary results, approve findings, submit final report, and develop action plan.

Project governance defines who will be responsible for various audit activities such as, for example, project execution, data analysis, project management, communication plan, report submission, and audit resolution, restitution, and action plan. This information should be provided such that the client is fully aware of the responsibilities of the audit team, as well as their own responsibilities.

Other information relative to a planned audit includes a spend category overview, audit team contact information, and next steps. Presenting the client with a list of next steps helps prevent any unanticipated events that may interfere with the day-to-day business of the client as well as hamper the efforts of the audit team in timely performing a successful contract audit, resolution and recovery. Next steps may include, for example, completing contracting process, initiating client internal data collection, planning and scheduling client internal process mapping, and plan and schedule supplier kickoff.

The audit team further reviews and signs any nondisclosure statements presented by the client (step 314). In another embodiment, the audit team may maintain nondisclosure statement templates applicable to various organization types and structures within contract database 145, for example. Accordingly, the audit team may provide appropriate one or more nondisclosure statements to an organization that has not implemented its own nondisclosure policy. Presentation and signing of nondisclosure statements may take place during the client kick-off or at a later time.

The audit team maps the audit process and requests specific data from the client (step 316). To map the audit process, the audit team determines the business processes and controls for the client, as well as accounting practices relating to billing categories and billing drivers. From this information, the audit team may determine what data is needed from the client. This data is requested from and supplied by the client.

The audit team further conducts a supplier kick-off meeting with a supplier that is named in the contract being audited (step 318). As in the case of the client kick-off meeting (step 312), an agenda is provided that outlines expectations. A presentation template may be used for this purpose to ensure consistency in information delivery among suppliers. This agenda may include, for example, an overview of what the audit team plans to accomplish, objectives and scope of the audit process, the review process, key inputs, how a successful review will be conducted, as well as the next steps in the audit process. Each of these items will now be discussed in greater detail.

In discussing what the audit team expects to accomplish, a team member should explain to the supplier that "control and compliance" is an integral part of a successful organization. The team member should also explain that their client has engaged them (audit team) to assist with their procurement control and compliance objectives. The supplier should be aware that the client, supplier, and audit team have an opportunity to work together to 1) enhance procurement process controls and efficiencies, 2) reduce financial risks and price non-compliance anomalies, and 3) improve overall quality of contract compliance. The supplier should further be aware that the ultimate goal of the audit is to enhance the mutually beneficial relationship between the client and the supplier.

A member of the audit team outlines the objectives and scope of the audit, which in one embodiment, includes: 1) review compliance to contract, 2) identify any non-compliance with a focus on financial impact, 3) identify any business process and contractual gaps, 4) highlight process improvements and reengineering opportunities, and 4) establish a sustainable contract compliance process. These objectives apply to services covered per the contract and related addendums, with a focus on the commodity, region, audit period, and spend.

To help the supplier to understand what to expect during the audit process, a process review is presented. In one embodiment, the process review details the kick-off meeting, contract review, data collection, data analysis, preliminary results and audit report. Please refer to the above description of FIG. 2 for a more detailed description of the process review.

The supplier should further be aware of the key inputs. In one embodiment, key inputs include 1) a defined end-to-end "Requisition to Payment" process, 2) a provided list of invoices under scope, 3) shared back-end line level billing data for invoices, 4) standard and/or ad-hoc reports, 5) shared details of non-contractual services and related billing, and 6) shared constraints or risks to review objectives.

In describing how a successful review will be conducted, the audit team may describe four factors leading to governance of the project. The four factors include "Team", "Communication", "Resolution", and "Execution." The team identifies the supplier single point of contact, the client single point of contact, and the primary auditor. This information provides more streamlined communication, whereby weekly calls and status reports keep each side informed. The identified contacts also lead to smoother resolution through follow-up logs and a defined escalation hierarchy and process. Execution takes place through action planning and report submission among the identified contacts. Moreover, to help the supplier understand what is expected of them, the audit team may outline next steps in the process to 1) identify a single point of contact, 2) provide contact details of relevant people, 3) highlight any constraints or risks to review objectives, and 4) schedule detailed discussion and weekly calls.

Figure 3B:
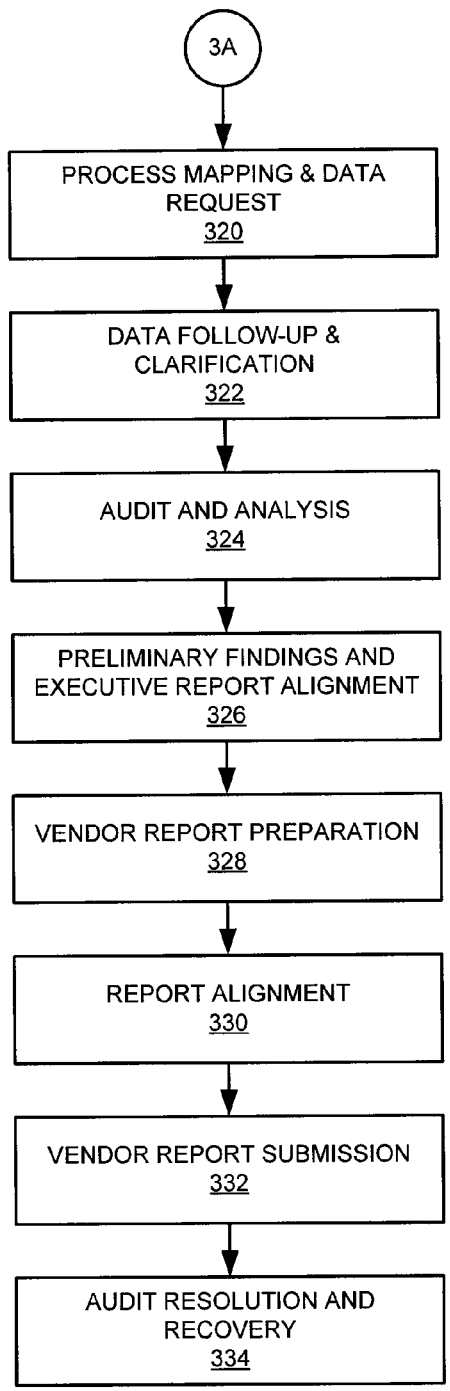

With reference to FIG. 3B, the audit team creates process maps and submits data requests to both the client and the supplier (step 320). Creating process maps may include frequent contact between the primary contacts in order to determine the unique business processes of the client and supplier. An understanding of these processes is very helpful in order to determine the data needs.

When mapping processes and determining data requirements, the audit team may follow-up with either of the client and supplier to request additional data or to seek clarification of issues discovered during the process mapping step (step 322). A follow-up log may be used to track furnishing of any additional information from either parties (client or supplier), involved in the review. In one embodiment, a follow-up log includes columns for recording a log number, request type, request description, status, date requested, target date committed, responsibility, reply to the request, and remarks from auditors.

With an understanding of the processes of both client and supplier, and having been equipped with the desired data, the audit team executes the audit and analysis process (step 324). Practitioners will appreciate that an audit may be based on both subjective and objective observations based on how data is examined, the type of measurements employed, tolerances, and the like. The system and method, as disclosed herein, is directed toward a methodology for executing contract audit, resolution and recovery tasks in a consistent manner, which results in greater savings for the client. Practitioners will further appreciate that the disclosed methodology may be applied to any contract audit, regardless of the precise audit techniques used.

Having audit findings carefully documented, the audit team may perform a preliminary finding alignment to ensure findings consistency (step 326). The audit team compiles the preliminary findings to prepare an executive and vendor report (step 328). Various templates may be used for this purpose to prepare a thorough and well organized report for presentation to the client. Such templates may reside as hard copies of printed documents, stored in contracts database 145 as word processor documents, created from a series of forms presented to user 100 by way of web client 105, or by any other means known in the art. In one embodiment, an executive and vendor report includes a table of contents, audit summary, audit overview, summary of findings, data available for audit, overall limitations and their implications to audit, description of findings, analysis, documents forming part of the report, disclaimer, and the like.

A report alignment (step 330) is performed to ensure that information in the report is consistent prior to submitting the report to the vendor (step 332). The vendor reviews the report and works with the audit team to ensure resolution and recovery (step 334). Practitioners will appreciate that resolution and recovery may include negotiation, as a vendor may not accept all of the findings in the report or may be reluctant to modify the terms of a contract based on the finding.

While the steps outlined above may represent certain specific embodiments of the invention, practitioners will appreciate that there are any number of methods, computing algorithms and user interfaces that may be applied to create similar results. The steps are presented for the sake of explanation only and are not intended to limit the scope of the invention in any way.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to 'at least one of A, B, and C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. All structural, chemical, and functional equivalents to the elements of the above-described exemplary embodiments that are known to those of ordinary skill in the art are expressly incorporated herein by reference and are intended to be encompassed by the present claims. Further, a list of elements does not include only those elements but may include other elements not expressly listed or inherent to such process, method, article, or apparatus.

We claim:

1. A method for performing an audit, resolution and recovery for a contract between a buyer and a supplier, said method including:
   defining, by a computer-based system for contract analysis, a scope of said audit, said resolution, and said recovery;
   documenting contacts for said buyer and said supplier;
   finalizing a charter for said audit, said resolution and said recovery;
   confirming appropriate approvals related to said audit and said recovery;
   creating, by said computer-based system, a buyer process map from information solicited from said buyer;
   defining intended objectives for said supplier;
   creating, by said computer-based system, a supplier process map from information solicited from said supplier;
   determining, by said computer-based system and based on said buyer process map and said supplier process map, data requirements for said buyer and said supplier, wherein said data requirements comprise direct client requirements for existing clients and Request for Proposal requirements for non-existing clients;
   requesting, by said computer-based system, data from said at least one of: said buyer and said supplier based on said data requirements;
   receiving, by said computer-based system, data from said at least one of: said buyer and said supplier;
   tracking, by said computer-based system, data received from said at least one of: said buyer and said supplier;
   performing, by said computer-based system, an analysis of said data to create audit findings;
   preparing preliminary findings and an executive report on said audit findings;
   aligning said audit findings with stakeholders of said buyer;
   preparing a report based on said audit findings;
   providing said report to said supplier;
   evaluating supplier performance against said contract;
   determining a current health of said contract;
   determining potential opportunities for improvement related to said contract;
   providing optimal and sustained cost savings for said buyer; and,
   conducting said resolution and said recovery with said supplier based on said report.

2. The method of claim 1, further including creating an action plan based on said resolution and said recovery, wherein said action plan includes tasks, and responsibilities for said tasks.

3. The method of claim 1, further including requesting additional data from said at least one of: said buyer and said supplier when said data is not sufficient to perform said analysis.

4. The method of claim 1, further including, prior to performing said analysis, reviewing said contract to obtain contract terms.

5. The method of claim 1, further including determining whether said audit findings are consistent.

6. The method of claim 1, wherein said analysis identifies business process and contractual gaps.

7. The method of claim 1, wherein said report includes identified opportunities based on said audit findings.

8. The method of claim 1, further including preparing a preliminary report to said at least one of: said buyer and said supplier to obtain approval of said audit findings.

9. The method of claim 1, further including providing said report to said buyer.

10. The method of claim 1, wherein said data includes at least one of: billing data, a contract term, a contract amendment, accounts payable, a purchase order, line-level billing, a timesheet, and a supplier report.

11. The method of claim 1, further including providing said buyer with at least one of: a project plan, a compliance audit, and an audit resolution plan.

12. The method of claim 1, further including determining project governance, wherein said project governance identifies responsibilities for at least one of: project execution, data analysis, project management, communication plan, report submission, and audit resolution.

13. The method of claim 1, further including preparing said report using a report template.

14. The method of claim 1, further including receiving a preliminary buyer information request form from said buyer, wherein said preliminary buyer information request form includes information relating to said supplier.

15. The method of claim 1, wherein defining intended objectives for said supplier comprises defining at least one of accomplishments, scope, process review, and key inputs.

16. An article of manufacture including a non-transitory, tangible computer readable medium having instructions stored thereon that, in response to execution by a computer-based system for performing an audit, resolution and recovery for a contract between a buyer and a supplier, cause the computer-based system to perform operations comprising:
   defining, by said computer-based system, a scope of said audit, said resolution, and said recovery;
   documenting, by said computer-based system, contacts for said buyer and said supplier;
   finalizing, by said computer-based system, a charter for said audit, said resolution and said recovery;
   confirming, by said computer-based system, appropriate approvals related to said audit and said recovery;
   creating, by said computer-based system, a buyer process map from information solicited from said buyer;
   defining, by said computer-based system, intended objectives for said supplier;
   creating, by said computer-based system, a supplier process map from information solicited from said supplier;
   determining, by said computer-based system and based on said buyer process map and said supplier process map, data requirements for said buyer and said supplier, wherein said data requirements comprise direct client requirements for existing clients and Request for Proposal, requirements for non-existing clients;
   requesting, by said computer-based system, data from said at least one of: said buyer and said supplier based on said data requirements;
   receiving, by said computer-based system, data from said at least one of: said buyer and said supplier;
   tracking, by said computer-based system, data received from said at least one of: said buyer and said supplier;
   performing, by said computer-based system, an analysis of said data to create audit findings;
   preparing, by said computer-based system, a preliminary findings and executive report on said audit findings;
   aligning, by said computer-based system, said audit findings with stakeholders of said buyer;

preparing, by said computer-based system, a report based on said audit findings;

providing, by said computer-based system, said report to said supplier;

evaluating, by said computer-based system, supplier performance against said contract;

determining, by said computer-based system, a current health of said contract;

determining, by said computer-based system, potential opportunities for improvement related to said contract;

providing, by said computer-based system, optimal and sustained cost savings for said buyer; and, conducting, by said computer-based system, said resolution and said recovery with said supplier based on said report.

17. The method of claim 1, wherein said tracking of said data is captured in a log, and wherein said log comprises columns for: recording a log number, a request type, a request description, a status, a request date, a target date committed, a responsibility assignment, a reply to the request, and remarks from said auditors.

18. The method of claim 1, wherein defining intended objectives for said supplier comprises defining key inputs, and wherein said key inputs comprise at least one of: a defined end-to-end Requisition to Payment process, a provided list of invoices under scope, shared back-end line level billing data for invoices, at least one of standard or ad-hoc reports, shared details of non-contractual services and related billing, and shared constraints and risks to review objectives.

* * * * *